United States Patent

Jin et al.

[11] Patent Number: 5,909,116
[45] Date of Patent: Jun. 1, 1999

[54] STRUCTURE FOR MOUNTING ACTUATING ROD STROKE SENSOR TO HYDRAULIC CYLINDER

[75] Inventors: Yong Il Jin; Soon Yong Yang, both of Changwon, Rep. of Korea

[73] Assignee: Samsung Heavy Industries Co., Ltd., Seoul, Rep. of Korea

[21] Appl. No.: 08/887,869

[22] Filed: Jul. 3, 1997

Related U.S. Application Data

[63] Continuation-in-part of application No. 08/546,839, Nov. 29, 1995, abandoned.

[51] Int. Cl.⁶ .................................................. G01B 7/14
[52] U.S. Cl. ........................................................ 324/207.24
[58] Field of Search ............................ 73/493, 514.39; 324/207.24, 207.15–207.17, 173, 174

[56] References Cited

U.S. PATENT DOCUMENTS

| | | | |
|---|---|---|---|
| 4,793,241 | 12/1988 | Mano et al. ..................... | 324/207.24 |
| 4,839,591 | 6/1989 | Nomura et al. .................. | 324/207.24 |
| 5,570,015 | 10/1996 | Takaishi et al. ................. | 324/207.24 |

*Primary Examiner*—Robert Raevis
*Attorney, Agent, or Firm*—Kenyon & Kenyon

[57] ABSTRACT

A structure for mounting an actuating rod stroke sensor to a hydraulic cylinder is disclosed. The sensor mounting structure has a sensor holder which is mounted to a predetermined portion of a cylinder head. A circuit board is tightly set in the sensor holder and holds the stroke sensor in the sensor holder. The above structure improves the operational precision of the stroke sensing operation and effectively fixes the sensor to the cylinder. The structure also protects the stroke sensor from the frictional heat generated during the reciprocating motions of the actuating rod, thereby lengthening the expected life span of the stroke sensor.

1 Claim, 3 Drawing Sheets

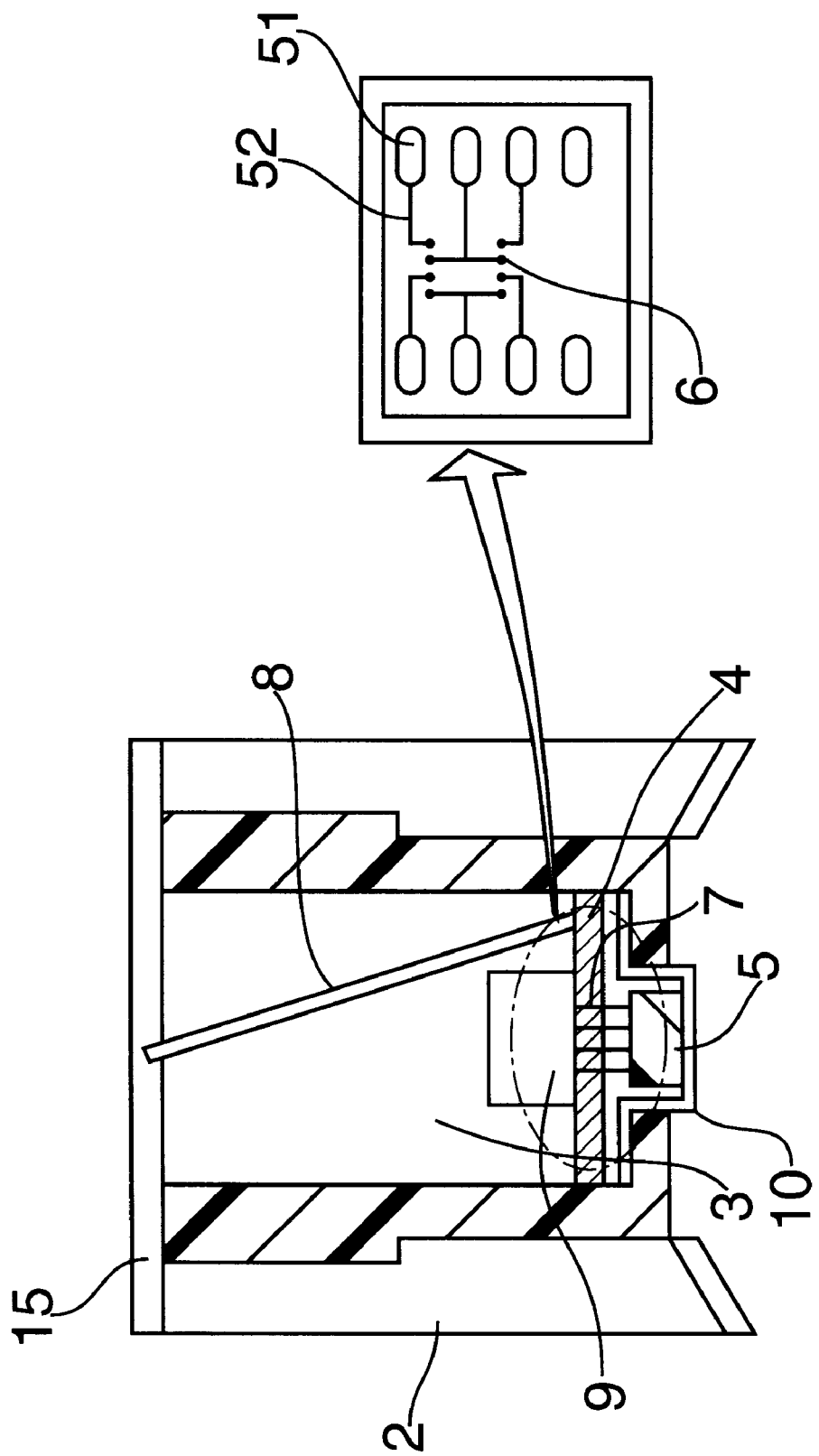

STRUCTURE FOR MOUNTING ACTUATING ROD STROKE SENSOR TO HYDRAULIC CYLINDER

This is a continuation-in-part of application Ser. No. 08/546,839, filed on Nov. 29, 1995, now abandoned.

BACKGROUND OF THE INVENTION

1. Field of the Invention

The present invention relates in general to hydraulic cylinders with actuating rod stroke sensors and, more particularly, to an improvement in a structure for mounting the actuating rod stroke sensor to the hydraulic cylinder. The actuating rod is provided with a magnetically transformed part so as to sense the piston's displacement during the reciprocating motions of the actuating rod.

2. Description of the Prior Art

As well known to those skilled in the art, construction equipment performs its operations under coarse operating conditions while generating considerable amounts of noise and vibrations, thereby being noted for causing accidents to surrounding workers. In addition, it has been very difficult finding skilled operators for construction equipment lately. In this regard, automatic or robotic construction equipment has been actively studied recently. In order to provide automatic or robotic construction equipment, the operational range of each working member of construction equipment should be automatically checked and controlled. For example, in power excavators, it is required to automatically check the displacement of the cylinder actuators corresponding to the boom, arm and bucket of the working members while performing the desired operations.

In order to automatically sense the displacement of typical cylinder actuators of the power excavators, the angles of joints between the working members of the power excavator may be sensed by positional sensors. Alternatively, the cylinder actuators may be provided with ultrasonic oscillators for checking the ultrasonic signals reflected by the tips of the actuating rods, thereby sensing the displacement of the cylinder actuators. The above typical method using either the positional sensors or ultrasonic oscillators are labelled "indirect sensing methods." As a further alternative, the displacement of the cylinder actuators may be sensed through a direct sensing method using magnetic graduations and sensors. In the above direct sensing method, the magnetic graduations of a magnetically transformed material are formed on each actuating rod. The sensor counts the number of magnetic graduations during the linear reciprocating motion of each piston relative to an associated cylinder, thereby sensing the displacement of the cylinder actuator.

The above method for sensing the cylinder's displacement by sensing the angle of the joints is particularly suitable to be used with either the boom or arm as the method is relatively cheaper and provides high operational precision. However, it is impossible to adapt the above method to the bucket which is typically operated under extremely coarse operating conditions. That is, as the bucket directly performs the operations while being brought into contact with the objects, it is impossible to use the above method for sensing the bucket cylinder's displacement. In this regard, the bucket cylinder's displacement has been sensed by the above-mentioned direct sensing method using magnetic graduations and sensors.

FIG. 1 shows the construction of a cylinder actuator whose displacement is sensed by the above-mentioned direct sensing method. In the above cylinder actuator, a piston 12 is received in a hydraulic cylinder 11 such that the piston 12 can linearly reciprocate in the cylinder 11 due to oil pressure. Axially extending from one side of the piston 12 so as to penetrate one end of the cylinder 11 is an actuating rod 13. A plurality of above-described magnetic graduations are formed on the surface of the actuating rod 13 at regular intervals. Spaced apart from the rod 13 by a predetermined distance A is a sensing means 14 which counts the number of magnetic graduations of the rod 13 during the reciprocating motions of the piston 12 in the cylinder 11, thereby sensing the stroke of the piston 12 in the cylinder 11.

An enlarged view of the sensing means 14 and the rod 13 in FIG. 1 is shown in FIG. 1A. A plurality of grooves, or graduations, 40 are formed directly on the rod 13 of the cylinder at constant intervals and are coated in chrome into the same external shape as the normal rod. In a cylinder head 15 of FIG. 1, a permanent magnet 49 and at least one stroke sensor 45 are mounted in a sensor holder 42. The permanent magnet 49 applies a magnetic field to the chrome layer 41 of the above groove 40 on the cylinder rod 13, thereby inducing its magnetic bias. The stroke sensor 45 is attached to a circuit board 44 for holding the sensor 45 and detects the magnetized degree of the chrome layer 41 in the groove 40. To put it more concretely, the output signal of the sensor has a sinusoidal form in general and can detect the displacement of the rod stroke of the cylinder by counting the sinusoidal output.

When the sensing means 14 is placed apart from the actuating rod 13 by a predetermined distance as described above, the sensing means 14 may fail to count the number of the magnetic graduations on the rod 13 accurately during the reciprocating motions of the piston 12 in the cylinder 11. In such case the sensing means 14 cannot detect the stroke of the piston 12 reciprocating in the cylinder 11 precisely, thereby resulting in the detected stroke of the piston 12 being different from the real stroke. On the other hand, when the sensing means 14 comes into contact with the actuating rod 13 in order to rectify the above problem, the sensing means 14 detects the stroke of the piston 12. However, in this case, the sensing means 14 may break because of the frictional heat generated from the actuating rod 13 during the reciprocating motion of the actuating rod 13.

In an effort to solve the above problems. Japanese U.M. Laid-open Publication No. Sho. 63-97804 discloses a sensor whose end portion, coming into contact with the reciprocating rod, is coated with a metal for improving the operational precision of the stroke sensing operation. However, the above Japanese sensor has a problem in that it is very difficult to coat metal on the nonmetal sensor. In addition, the frictional heat generated during the reciprocating motion of the actuating rod is directly transmitted to the above sensor, thereby causing the sensor to break and needing to be frequently changed with a new one.

On the other hand, Japanese U.M. Laid-open Publication No. Sho. 63-58707 discloses a somewhat improved structure for holding a sensor. In the above Japanese structure, the sensor 22 is held by a sensor holder 21 as shown in the accompanying drawing, FIG. 2. In addition, Japanese U.M. Laid-open Publication No. Heisei. 4-77007 discloses a sensor 31 whose top is provided with a slit 32 and which is mounted in the sensor holder 34 as shown in FIG. 3. The position of the above sensor 31 can be adjusted by a pin 33.

SUMMARY OF THE INVENTION

It is, therefore, an object of the present invention to provide a structure for mounting an actuating rod stroke sensor to a hydraulic cylinder in which the above problems can be overcome and which improves the operational precision of the stroke sensing operation, effectively fixes the sensor to the cylinder and protects the sensor from the frictional heat generated during the reciprocating motions of the actuating rod, thereby lengthening the expected life span of the sensor.

In order to accomplish the above objects, the present invention provides a structure for mounting an actuating rod stroke sensor to a hydraulic cylinder comprising a sensor holder mounted to a predetermined portion of a cylinder head of the hydraulic cylinder, and a circuit board tightly set in the sensor holder and adapted for holding the stroke sensor in the sensor holder.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a view showing the construction of a cylinder actuator with a stroke sensor mounting structure in accordance with a preferred embodiment of the present invention; and FIG. 4A is a partially enlarged view of a printed circuit board of the cylinder actuator of FIG. 4.

DETAILED DESCRIPTION OF THE INVENTION

FIG. 4 is a view showing the construction of a cylinder actuator with a stroke sensor mounting structure in accordance with a preferred embodiment of the present invention. FIG. 4A is a partially enlarged view of a printed circuit board of the above cylinder actuator.

As shown in FIG. 4, the sensor mounting structure of this invention includes a sensor holder 2 which is mounted to a predetermined portion of a cylinder head 15. The above sensor holder 2 has a fixing slot 3 which is formed inside the holder 2 longitudinally along the axis of the sensor holder 2. The sensor mounting structure also includes a printed circuit board 4. The circuit board 4, which has a configuration corresponding to the fixing slot 3, is tightly seated in the slot 3.

Figure 1:
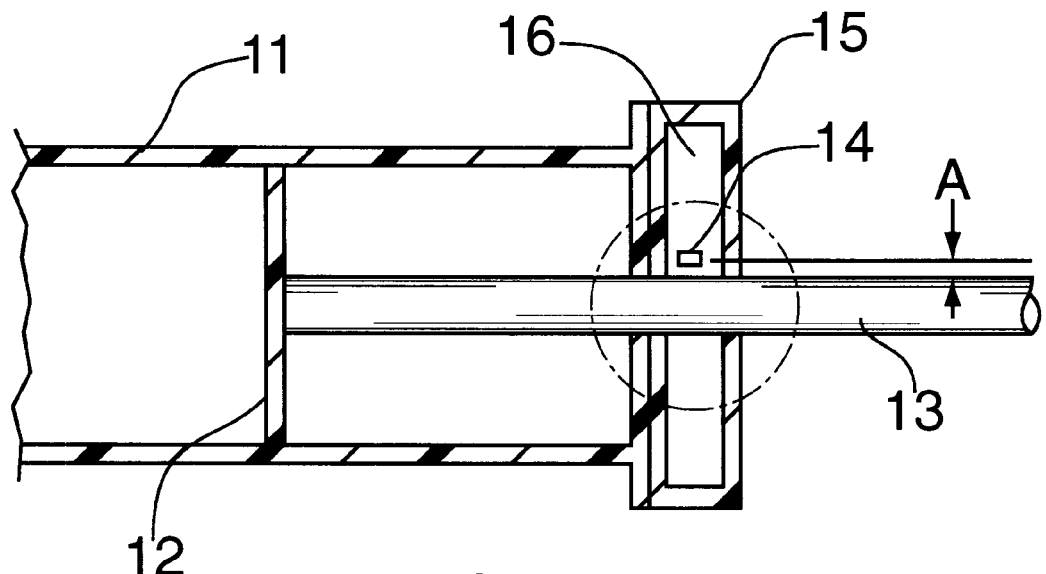
FIG. 1 is a view showing the construction of a cylinder actuator with a stroke sensing means in accordance with an embodiment of the prior art.
Figure 1A:
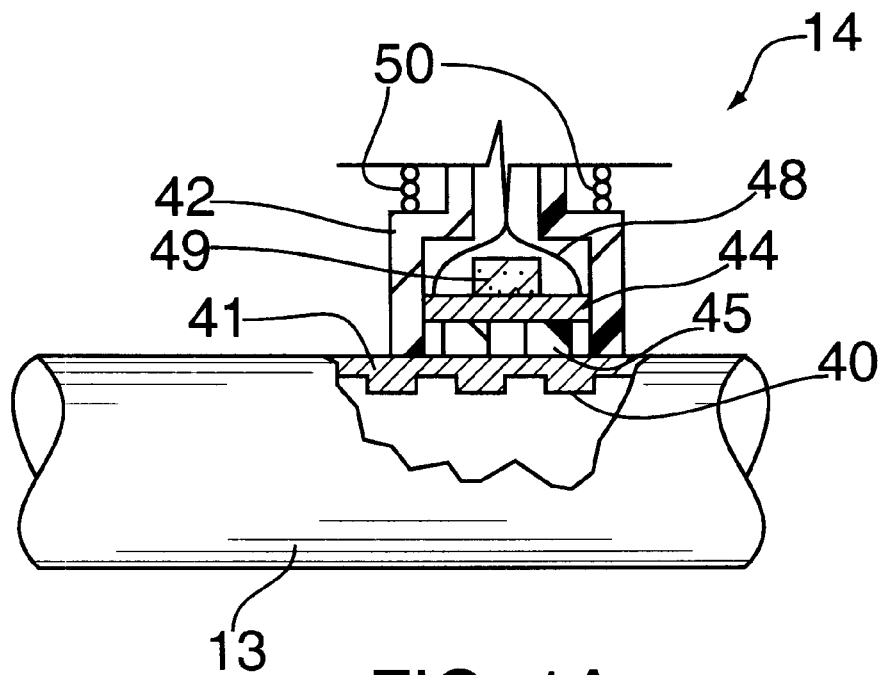
FIG. 1A is a side-elevational cross-sectional view of the stroke sensing means and the actuating rod of FIG. 1, which view is taken along the plane extending along the length of the actuating rod.
Figure 2:
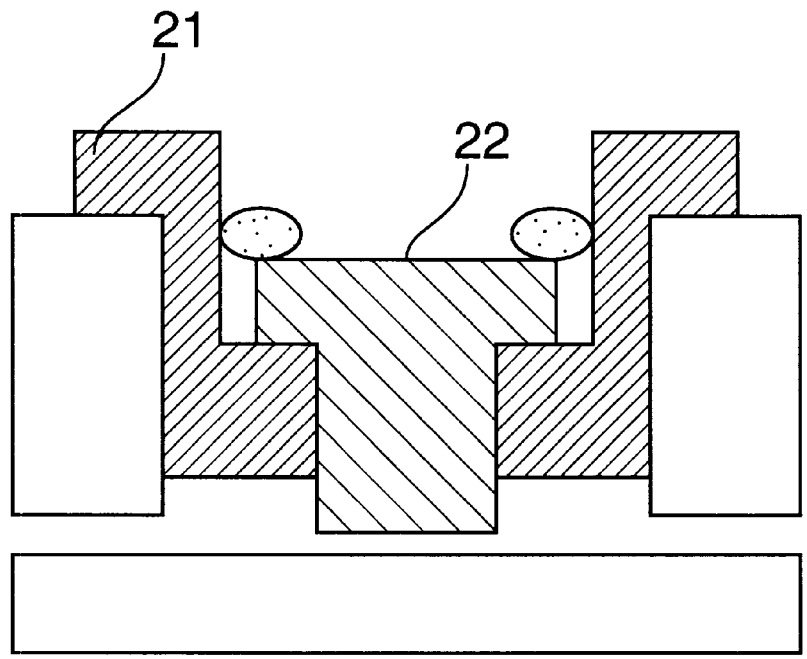
FIG. 2 is a side-elevational cross-sectional view of a stroke sensor and a cylinder actuator in accordance with another embodiment of the prior art, which view is taken along the plane extending along the length of the actuating rod of the cylinder actuator.
Figure 3:
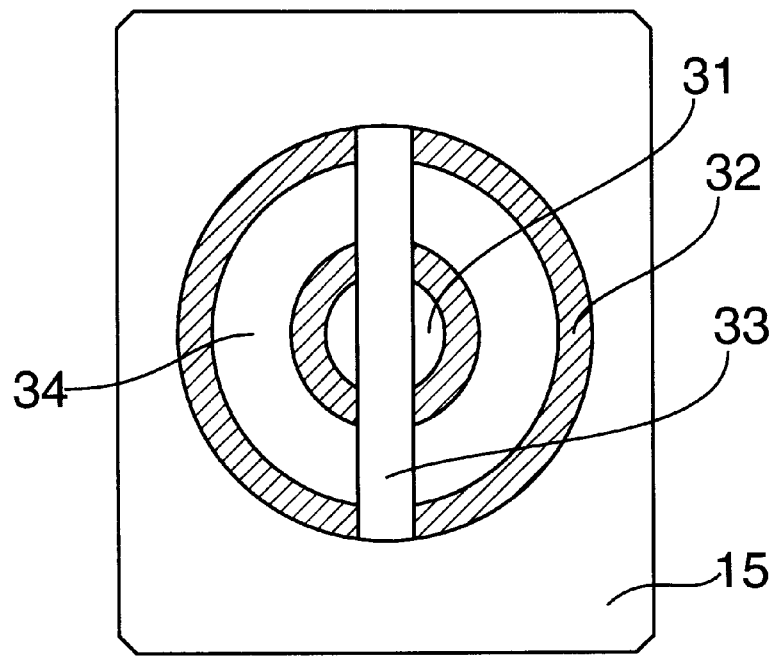
FIG. 3 is a top cross-sectional view showing the construction of a sensor holder and a stroke sensor in accordance with yet another embodiment of the prior art, which view is taken along the plane extending transverse to the longitudinal axis of the sensor holder.

A conventional sensor holder, as indicated by reference numeral 42 in FIG. 1A, for example, is formed into a cylinder having a sectional shape of a right circle. The sensor holder 42, which is a portion of the sensing means 14 shown in FIG. 1, is mounted to a predetermined position on the inside of the cylinder head 15 through a long, right cylindrical slot 16. The cylindrical slot 16 formed in the cylinder head 15 receives the sensor holder 42 ina the direction perpendicular to the surface of the actuating rod 13. The sensor holder 42 is conventionally secured in the cylindrical slot 16 by means of a spring 50 which presses the sensor holder 42 downwardly against the surface of the actuating rod 13 like the spring shown in the magnetic stroke sensing apparatus of U.S. Pat. No. 4,839,541, issued Jun. 13, 1989, to Nomura et al. In this case, however, the sensor holder 42 may rotate during mounting, thereby failing to be mounted correctly and thus failing to detect the precise stroke of the actuating rod 13. To rectify this problem, a pin 33 for adjusting the position of the sensor has been used conventionally, as shown in FIG. 3. In the present invention shown in FIG. 4, this problem can be solved by forming the sensor holder 2 and the cylindrical slot 16 into a cylinder with its sectional shape being a polygon or a circle with at least one projection part. Because an outer circumferential contour of the sensor holder 2 conforms to an inner one of the cylindrical slot 6, the sensor holder 12 does not rotate while mounted to a predetermined position in the cylinder head 15.

It is preferred that the circuit board 4 is tightly set in the sensor holder 2 by having the circumferential contour of the circuit board 4 conforming to the inner circumferential contour of the sensor holder 2. In this case, the stroke sensor 5 can be fixed in the sensor holder 2 because the stroke sensor 5 is fixedly mounted to the circuit board 4.

In the present invention, in order to fixedly mount the stroke sensor 5 to the above circuit board 4, it is preferred to form a plurality of holes 6 in the circuit board 4, as shown in FIG. 4A, and to form a plurality of leads 7 on the top portion of the sensor 5, as shown in FIG. 4. The leads 7 of the sensor 5 are fitted into the corresponding holes 6 of the circuit board 4 respectively and then soldered to the circuit board 4, thereby fixedly mounting the sensor 5 to the circuit board 4.

In FIG. 4, the reference numeral 8 denotes a cable which connects the sensor 5 with a controller (not shown). Generally, directly connecting the cable 8 to the stroke sensor 5 presents a problem because the intervals between the leads 7 of the stroke sensors 5 are too narrow and a short circuit can be generated between the adjacent sensors 5. In the present invention, to overcome this problem, at least one pad 51 for soldering and a predetermined connection pattern 52 are provided on the circuit board 4. To the pad 51 is connected the cable 8 by soldering and the pad 51 is connected to the holes 6 through a predetermined connection pattern 52 on the circuit board 4.

The intervals between adjacent stroke sensors are preferably given to be (2N×D)+0.5 where D is an interval between adjacent magnetic graduations 40 formed on an actuating rod and N=0,1,2, . . . For example, in the case where the interval between two adjacent magnetic graduations 40 of the actuating rod 13 is 1 mm, the preferred intervals between adjacent stroke sensors 5 will be 2N+0.5 mm where N=0, 1, 2, . . . In this case, the phase difference between output signals of the adjacent sensors 5 becomes 90 degrees. The interval between adjacent stroke sensors 5 can be accurately adjusted by making the adjacent rows of holes 6 on the circuit board 4 spaced apart from each other in the interval equal to that between adjacent stroke sensors 5 as shown in FIG. 4A.

In the present invention shown in FIG. 4, as in FIG. 1A, a permanent magnet 9 is also provided being supported by a circuit board 4. The permanent magnet 9 also serves to apply a magnetic field to the chrome layer 41 of the groove 40 on the actuating rod 13, thereby inducing its magnetic bias.

In the above sensor mounting structure shown in FIGS. 4 and 4A, a thin plate 10 is held by the sensor holder 2 on both of its sides. The above thin plate 10 comes into contact with the bottom surface of the stroke sensor 5, thereby supporting the sensor 5 in the sensor holder 2.

In accordance with the sensor mounting structure of the invention, the stroke sensor 5 is fixedly mounted to the printed circuit board 4, thereby maintaining its preset position relative to the actuating rod irrespective of operational impact and vibrations of the cylinder actuator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure for mounting at least one actuating rod stroke sensor to a hydraulic cylinder, wherein said stroke sensor, mounted to a cylinder head of said hydraulic cylinder, detects a displacement of a rod stroke by estimating a magnitude of magnetization of an actuating rod of the hydraulic cylinder induced by a permanent magnet mounted in said cylinder head, comprising:

a sensor holder mounted to a predetermined portion of a cylinder head of said hydraulic cylinder;

a circuit board tightly set in said sensor holder and adapted for holding said stroke sensor in said sensor holder;

a plurality of holes formed on said circuit board: and a plurality of leads extended from a top portion of said stroke sensor, said plurality of leads being fitted into said plurality of holes to mount said stroke sensor to said circuit board;

wherein said sensor mounting structure is adapted for mounting a plurality of stroke sensors to said hydraulic cylinder, and wherein an interval between adjacent stroke sensors is $(2N \times D)+0.5$ on said circuit board where D is an interval between adjacent magnetic graduations formed on said actuating rod and said N is an integer equal to or greater than zero, whereby a phase difference between output signals of two adjacent stroke sensors are 90 degrees.

* * * * *